United States Patent
Ozaki

[11] Patent Number: 6,052,235
[45] Date of Patent: Apr. 18, 2000

[54] TELEPHOTO ZOOM LENS

[75] Inventor: Hiroyasu Ozaki, Tokyo, Japan

[73] Assignee: Asahi Kogaku Kogyo Kabushiki Kaisha, Tokyo, Japan

[21] Appl. No.: 08/954,901

[22] Filed: Oct. 21, 1997

[30] Foreign Application Priority Data

Nov. 19, 1996 [JP] Japan .................................. 8-308513

[51] Int. Cl.$^7$ .............................................. G02B 15/14
[52] U.S. Cl. ............................................................ 359/686
[58] Field of Search ...................... 359/686, 687, 359/676, 683

[56] References Cited

U.S. PATENT DOCUMENTS 4,662,724  5/1987  Moriyama ............................. 359/687
5,061,053  10/1991 Hirakawa .............................. 359/690
5,572,277  11/1996 Uzawa et al. ......................... 359/686

FOREIGN PATENT DOCUMENTS 1310322  12/1989  Japan .

Primary Examiner—Huy Mai
Attorney, Agent, or Firm—Greenblum & Bernstein P.L.C.

[57] ABSTRACT

A telephoto zoom lens includes a first positive lens group, a second negative lens group, a third positive lens group and a fourth lens group. A resultant refractive power of the third and fourth lens groups are moved from an image side to an object side upon zooming from a short focal length extremity to a long focal length extremity, so that a distance between the first and second lens groups increases, a distance between the second and third lens groups decreases, and a distance between the third and fourth lens groups becomes smallest at an intermediate focal length. The zoom lens satisfies a condition specified by ($0.1 < X_3/X_1 < 0.5$), wherein $X_1$ represents a distance between a position at the short focal length extremity and at the long focal length extremity of the first lens group on an optical axis, and $X_3$ represents a distance between the positions at the short focal length extremity and at the long focal length extremity of the third lens group on the optical axis, respectively.

7 Claims, 19 Drawing Sheets

1 : 5.6
c LINE
d LINE
g LINE
-0.5  0.5
SPHERICAL
ABERRATION
CHROMATIC
ABERRATION

W = 3.9°
-0.05  0.05
TRANSVERSE
CHROMATIC
ABERRATION

W = 3.9°
M    S
-0.5  0.5
ASTIGMATISM

W = 3.9°
-5.0 (%) 5.0
DISTORTION

1 : 4.7

---g LINE
---d LINE
---c LINE

-0.5  0.5
SPHERICAL
ABERRATION
CHROMATIC
ABERRATION

W = 15.1°

-0.05  0.05
TRANSVERSE
CHROMATIC
ABERRATION

W = 15.1°

---M
S---

-0.5  0.5
ASTIGMATISM

W = 15.1°

-5.0(%) 5.0
DISTORTION

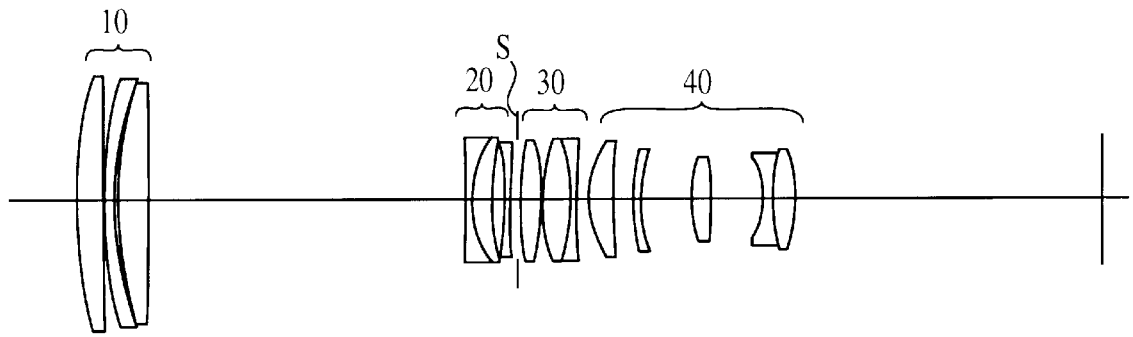
FIG. 12
FIG. 13A 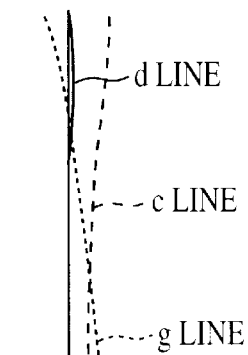 FIG. 13B 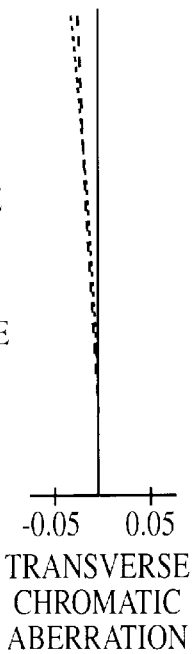 FIG. 13C 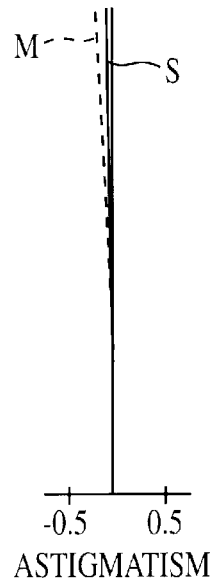 FIG. 13D 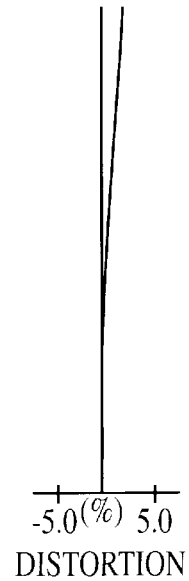
SPHERICAL ABERRATION CHROMATIC ABERRATION
TRANSVERSE CHROMATIC ABERRATION
ASTIGMATISM
DISTORTION

SPHERICAL ABERRATION CHROMATIC ABERRATION

TRANSVERSE CHROMATIC ABERRATION

ASTIGMATISM

DISTORTION

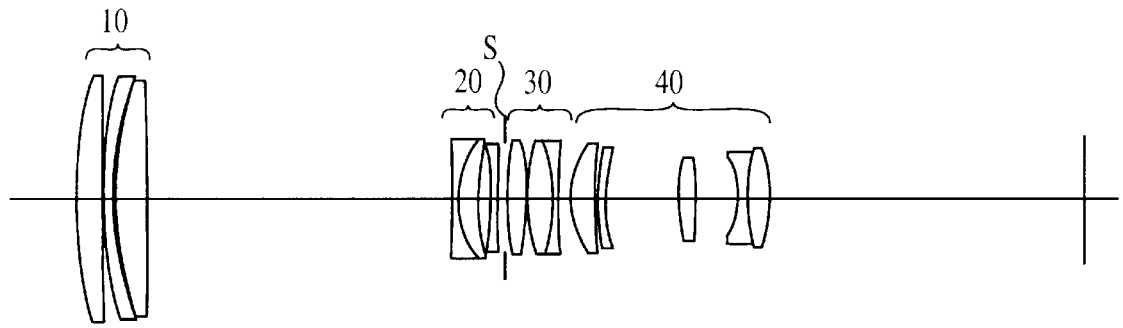
FIG. 18
FIG. 19A  FIG. 19B  FIG. 19C  FIG. 19D
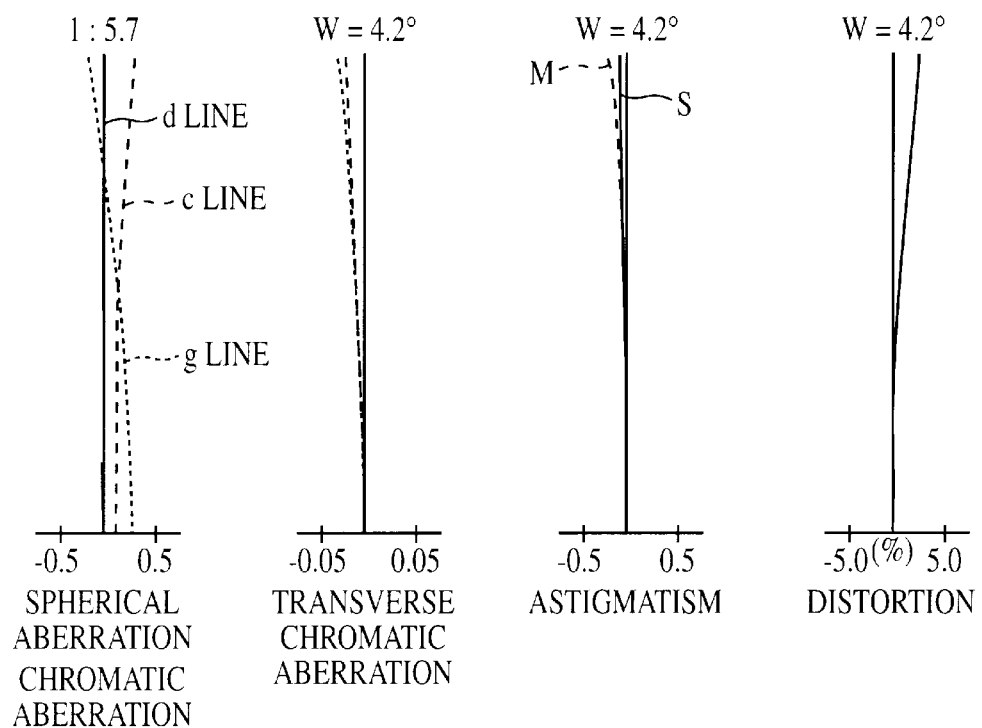

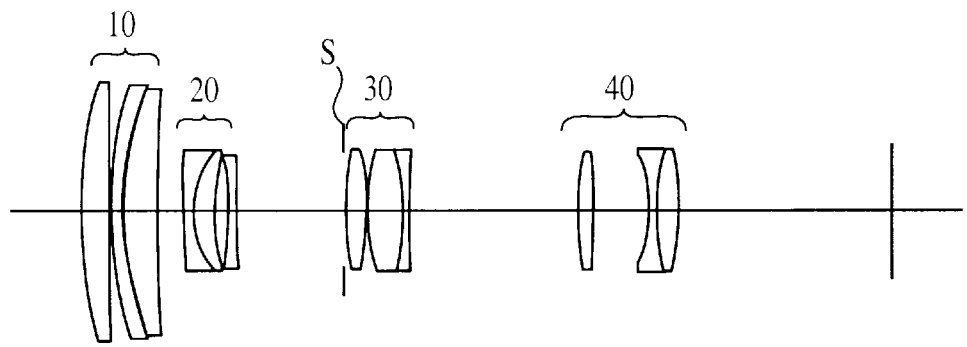
FIG. 20
FIG. 21A   FIG. 21B   FIG. 21C   FIG. 21D
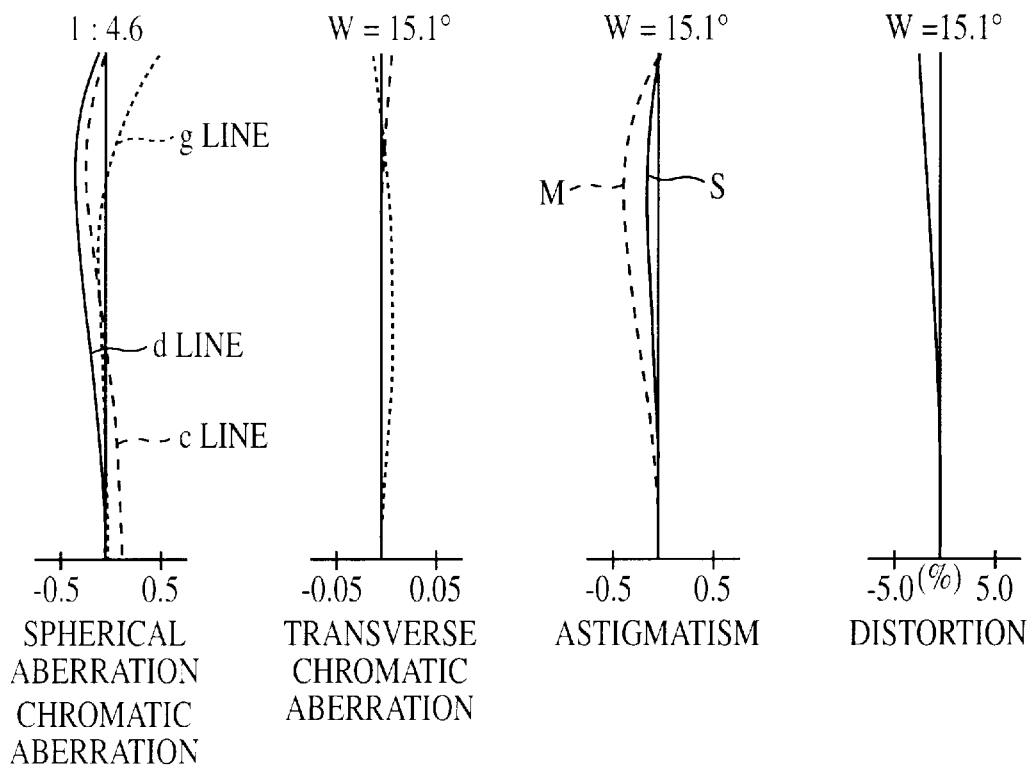

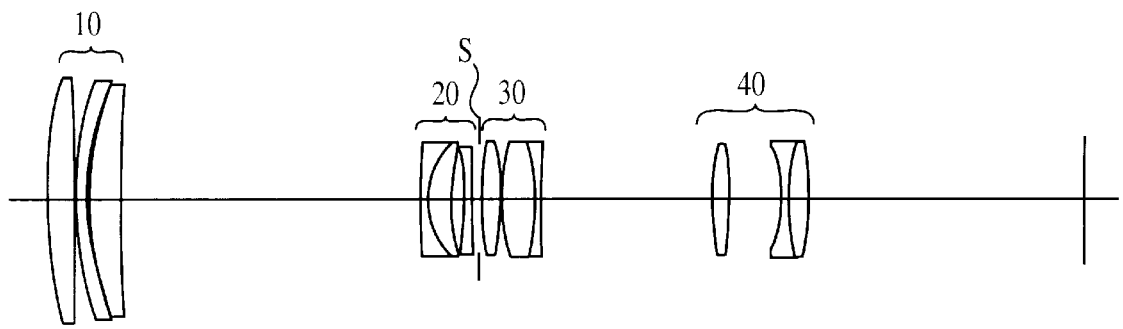
FIG. 24
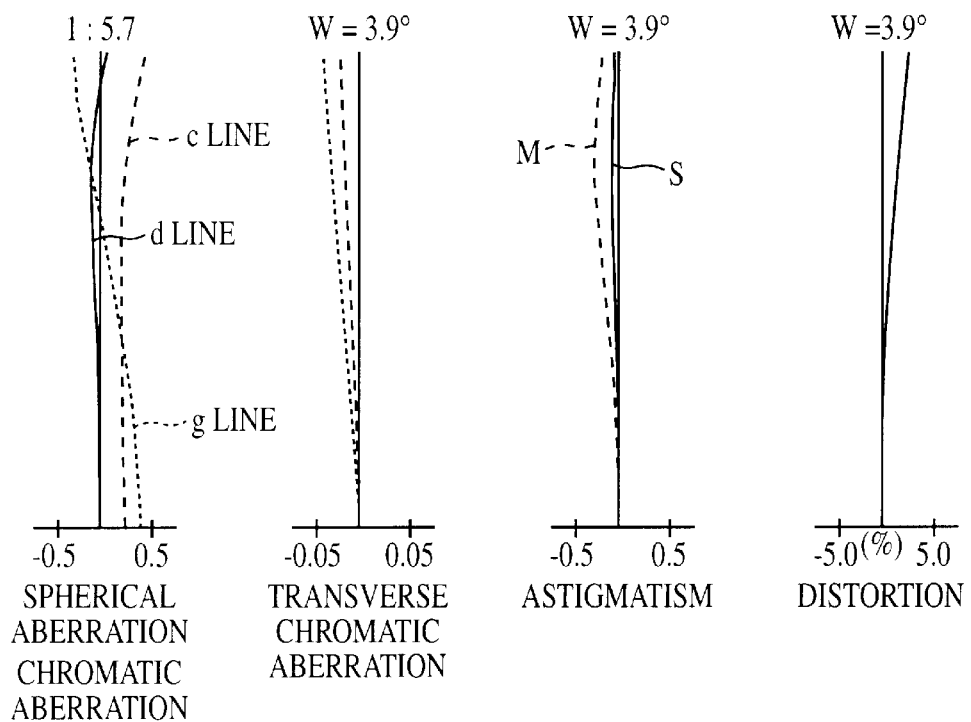

SPHERICAL ABERRATION CHROMATIC ABERRATION

TRANSVERSE CHROMATIC ABERRATION

ASTIGMATISM

DISTORTION

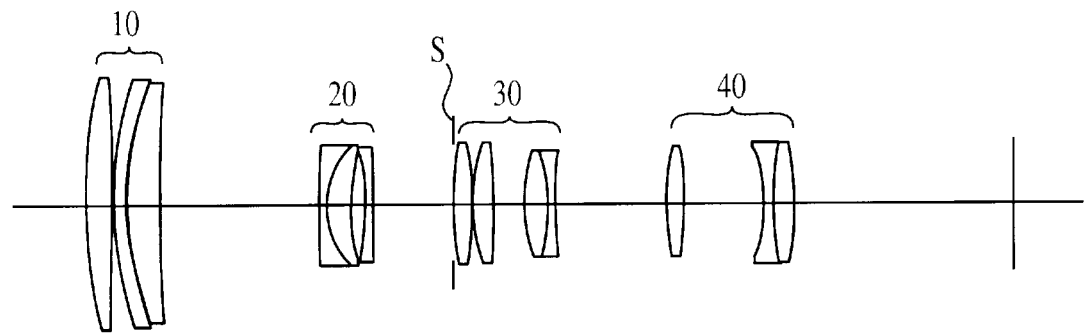
FIG. 34
FIG. 35A   FIG. 35B   FIG. 35C   FIG. 35D
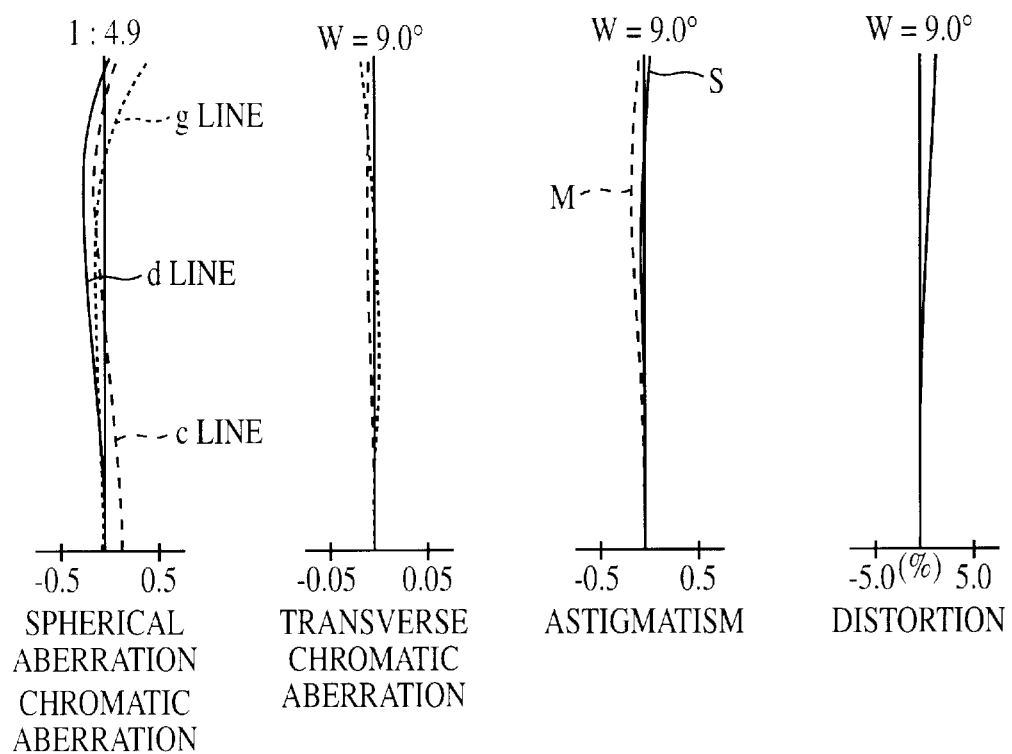

TELEPHOTO ZOOM LENS

BACKGROUND OF THE INVENTION

1. Field of the Invention

The present invention relates to a telephoto zoom lens (short zoom lens) for a photographic camera and in particular, it relates to a small and high-performance telephoto zoom lens having a zoom ratio of approximately 4.

2. Description of the Related Art

A telephoto zoom lens is known having a zoom ratio of approximately 3, as disclosed in, for example Japanese Unexamined Patent Publication No. 1-310322, in which three lens groups, i.e., a first positive lens group, a second negative lens group and a third positive lens group are included, wherein the three lens groups are independently moved to carry out the zooming.

However, no compact three-lens group type zoom lens is known having a zoom ratio of approximately 4. Moreover, in the known three-lens group type zoom lens, if the zoom ratio is being around 4, the curvature of the field caused by the zooming is too large to correct.

SUMMARY OF THE INVENTION

It is an object of the present invention to provide a small telephoto zoom lens having a zoom ratio of around 4 and exhibiting a high performance over the entire zoom range.

To achieve the object mentioned above, according to the present invention, there is provided a telephoto zoom lens comprising a first lens group of positive refractive power, a second lens group of negative refractive power, a third lens group of positive refractive power, and a fourth lens group, arranged in this order from the object side, the resultant refractive power of the third and fourth lens groups being positive, wherein said first, third and fourth lens groups are moved from the image side to the object side upon zooming from a short focal length extremity to a long focal length extremity, so that the distance between the first and second lens groups increases, that the distance between the second and third lens groups decreases, and that the distance between the third and fourth lens groups becomes smallest at an intermediate focal length, and wherein the zoom lens satisfies the following condition (1):

$$0.1 < X_3/X_1 < 0.5 \quad (1)$$

wherein $X_1$ designates the distance between the position of the first lens group at the short focal length extremity and the position of the first lens group at the long focal length extremity on the optical axis, and $X_3$ designates the distance between the position of the third lens group at the short focal length extremity and the position of the third lens group at the long focal length extremity on the optical axis, respectively.

Preferably, the telephoto zoom lens satisfies the following conditions (2) and (3):

$$1.5 < f_1/f_w < 2.2 \quad (2)$$

$$0 < f_3/|f_4| < 0.7 \quad (3)$$

wherein $f_w$ designates the focal length of the entire zoom lens at the short focal length extremity, $f_1$ designates the focal length of the first lens group, $f_3$ designates the focal length of the third lens group, and $f_4$ designates the focal length of the fourth lens group.

The telephoto zoom lens preferably satisfies the following condition (4):

$$0 < m_{4s} < 1.0 \quad (4)$$

wherein $m_{4s}$ designates the lateral magnification of the fourth lens group at the short focal length extremity.

According to an aspect of the present invention, the second lens group is moved from the object side to the image side upon zooming from the short focal length extremity to the long focal length extremity. In another aspect of the present invention, the second lens group does not move upon zooming from the short focal length extremity to the long focal length extremity.

A diaphragm can be moved together with the third lens group upon zooming.

The focusing can be carried out by the first lens group.

The present disclosure relates to subject matter contained in Japanese Patent Application No.08-308513 (filed on Nov. 19, 1996) which is expressly incorporated herein by reference in its entirety.

BRIEF DESCRIPTION OF DRAWINGS

The invention will be described below in detail with reference to the accompanying drawings, in which:

FIG. 12 is a schematic view showing the lens arrangement of the second embodiment of a telephoto zoom lens at a long focal length extremity, according to the present invention;

FIGS. 13A, 13B, 13C and 13D show aberration diagrams of the telephoto zoom lens shown in FIG. 12;

FIG. 18 is a schematic view showing the lens arrangement of the third embodiment of a telephoto zoom lens at a long focal length extremity, according to the present invention;

FIGS. 19A, 19B, 19C and 19D show aberration diagrams of the zoom lens shown in FIG. 18;

FIG. 20 is a schematic view showing the lens arrangement of a fourth embodiment of a telephoto zoom lens at a short focal length extremity, according to the present invention;

FIGS. 21A, 21B, 21C and 21D show aberration diagrams of the zoom lens shown in FIG. 20;

FIG. 24 is a schematic view showing the lens arrangement of the fourth embodiment of a telephoto zoom lens at a long focal length extremity, according to the present invention;

FIGS. 25A, 25B, 25C and 25D show aberration diagrams of the zoom lens shown in FIG. 24;

FIG. 34 is a schematic view showing the lens arrangement of the sixth embodiment of a telephoto zoom lens at an intermediate focal length, according to the present invention;

FIGS. 35A, 35B, 35C and 35D show aberration diagrams of the zoom lens shown in FIG. 34;

DESCRIPTION OF THE PREFERRED EMBODIMENT

Figure 1:
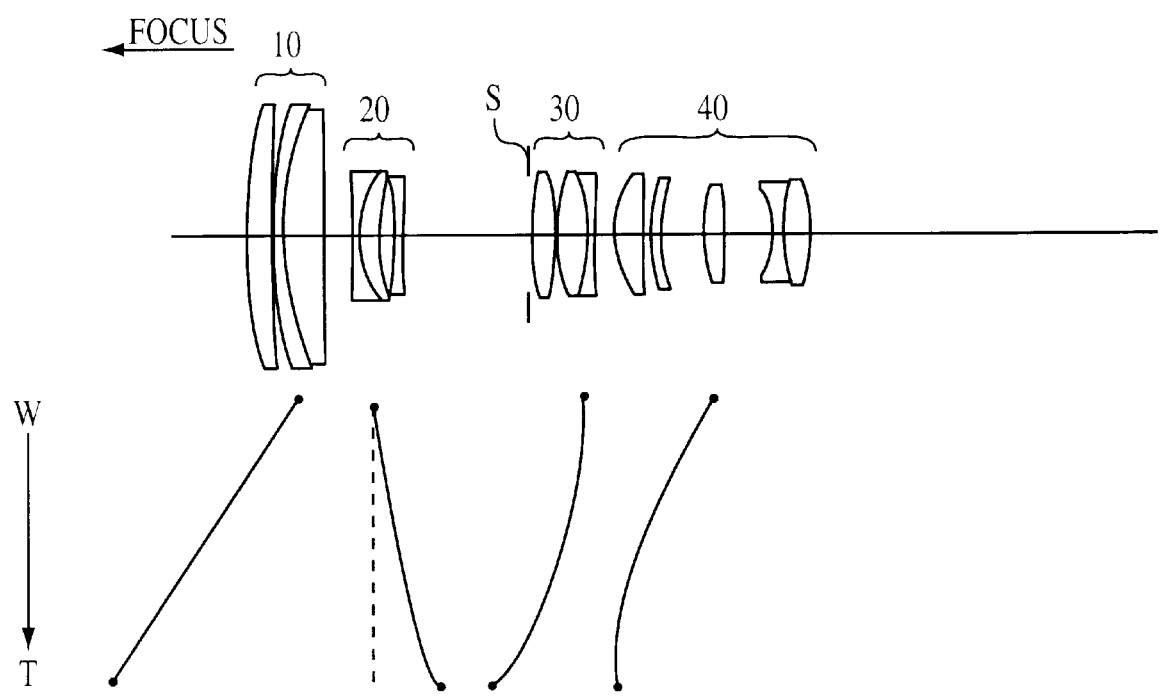
FIG. 1 shows a lens arrangement of a telephoto zoom lens and tracks of the movement of the lens groups during the zooming, according to the present invention.

As seen in FIG. 1, a telephoto zoom lens according to an embodiment of the present invention is comprised of a first lens group 10 of positive refractive power, a second lens group 20 of negative refractive power, a diaphragm (stop) S, a third lens group 30 of positive refractive power, and a fourth lens group 40. These optical elements are arranged in this order from the object side. The refractive power of the fourth lens group 40 can be positive, zero, or negative, so long as the resultant focal length of the third and fourth lens groups is positive.

Upon zooming from the short focal length extremity W to the long focal length extremity T in the arrangement shown in FIG. 1, the first, third and fourth lens groups 10, 30 and 40 are moved from the image side toward the object side, so that the distance between the first and second lens groups 10 and 20 increases; the distance between the second and third lens groups 20 and 30 decreases; and the distance between the third and fourth lens groups 30 and 40 becomes smallest at an intermediate focal length (floating zoom). As may be seen from the foregoing, upon zooming from the short focal length side toward the long focal length side, the distance between the third and fourth lens groups decreases until they come to an intermediate focal length position, and thereafter increases from the intermediate focal length to the long focal length extremity. Consequently, it is possible to prevent the curvature of the field at the intermediate focal length from increasing.

Looking at the tracks of the movement of the lens groups indicated by solid lines in FIG. 1, the second lens group 20 moves from the object side to the image side during the zooming operation. Alternatively, it is possible to keep the second lens group immovable during the zooming operation, as indicated by a phantom line.

Focusing is carried out by the first lens group 10. The diaphragm S is secured to the front portion of the third lens group 30 so as to move together therewith.

If the third and fourth lens groups are moved together without changing the distance therebetween, the lens arrangement is identical to a conventional three-lens group type zoom lens having a first positive lens group, a second negative lens group and a third positive lens group. In the three-lens group type zoom lens, if an attempt to increase the zoom ratio to approximately 4 is made, the total length of the zoom lens is increased, but the curvature of the field at the intermediate focal length becomes too large to correct as mentioned above.

Condition (1) specifies the total moving distance (i.e., the moving distance from the short focal length extremity W to the long focal length extremity T) of the first lens group and the third lens group during the zooming operation. If the ratio defined in condition (1) is higher than the upper limit, that is, if the total moving distance of the third lens group relative to the first lens group is large, it is necessary to provide a sufficient distance between the second lens group and the third lens group at the short focal length extremity, so that the axial length of the zoom lens particularly at the short focal length extremity is increased.

In addition, it is necessary to restrict the positional change of the exit pupil in order to use the zoom lens for an autofocus camera. In the four-lens group type zoom lens according to the present invention, since the diaphragm is located close to the third lens group, if the relative movement of the third lens group is reduced as defined in condition (1), the change in the position of the exit pupil is restricted. Moreover, the diaphragm mechanism can be simplified.

If the ratio defined in condition (1) is smaller than the upper limit, that is, if the relative movement of the third lens group is reduced, the zoom ratio is varied chiefly by the second lens group, thus resulting in no realization of a zoom lens having a zoom ratio of approximately 4. Furthermore, aberrations produced during the zooming largely fluctuate, and in particular, a comatic aberration is too large to correct.

Condition (2) specifies the focal length of the first lens group. If the ratio defined in condition (2) is greater than the upper limit, it is difficult to make the zoom lens small. If the ratio defined in condition (2) is smaller than the lower limit, the zoom lens can be made small, but aberrations produced during the zooming or focusing largely fluctuate. In addition to the foregoing, a back focal distance at the short focal length extremity is so small that the zoom lens may interfere with a quick-return mirror or the like of a SLR camera.

Condition (3) specifies the ratio of the focal length between the third and fourth lens groups that contribute to a correction of the position of the image plane which varies during the zooming operation. Light emitted from the second lens group is divergent light. It is preferable that the third lens group, which receives the divergent light, has a relatively strong refracting power to convert the light to form an image and that the fourth lens group has a relatively weak refracting power to correct aberrations, particularly astigmatism and distortion.

If the ratio defined in condition (3) is above the upper limit, the refracting power of the fourth lens group relative to the third lens group is too large to correct the aberrations produced by the zooming operation. Conversely, if the ratio is below the lower limit in condition (3), the third lens group has a negative power, contrary to the basic construction of the present invention.

Condition (4) specifies the lateral magnification of the fourth lens group at the short focal length extremity.

If the value in condition (4) exceeds the upper limit, it is possible to make the zoom lens small, but the resultant refracting power of the first through third lens groups is so strong that aberrations produced during zooming cannot be effectively compensated.

If the value defined in condition (4) is smaller than the lower limit, it is impossible to realize a compact zoom lens. In addition, the number of the lens elements of the fourth lens group is increased, and hence the manufacturing cost of the zoom lens is increased.

Numerical examples of the zoom lens system of the present invention will be discussed below with reference to the following tables and drawings. In the following tables and drawings, $F_{NO}$ designates a F-number, F designates a focal length, W designates a half angle of view, $f_B$ designates a back focal distance (distance between the last surface of the fourth lens group and the image surface), R designates a radius of curvature, D designates a distance between the lens surfaces, Nd designates a refractive index of the d-line, and υd designates an Abbe number, respectively. In the following aberration diagrams, a d-line a g-line and a C line represent chromatic aberrations represented by spherical aberrations and lateral chromatic aberrations at respective wavelengths, S represents an image surface of a Sagittal image, and M represents the image surface of a Meridional image.

<Embodiment 1>

Figure 2:
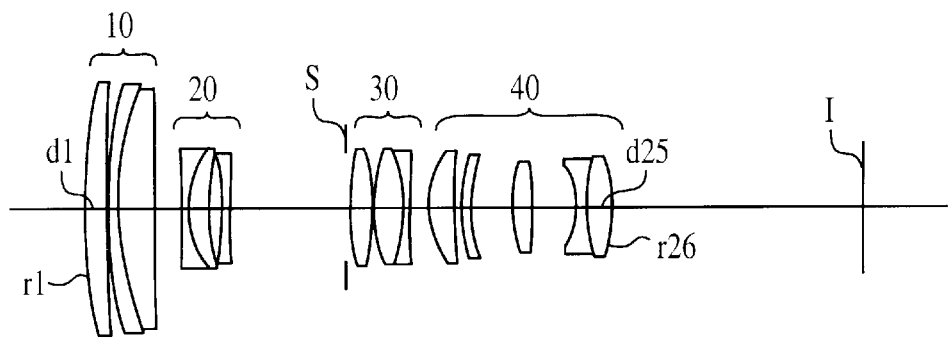
FIG. 2 is a schematic view showing the lens arrangement of a first embodiment of a telephoto zoom lens at a short focal length extremity, according to the present invention.
Figures 3A, 3B, 3C, 3D:
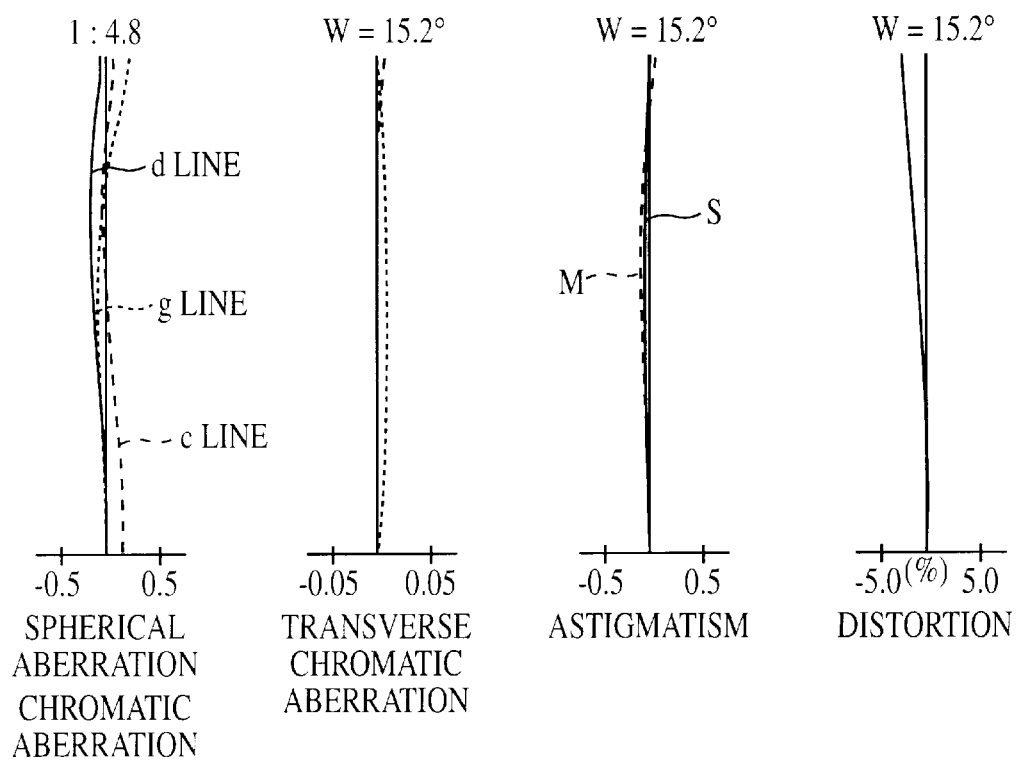
FIGS. 3A, 3B, 3C and 3D show aberration diagrams of a telephoto zoom lens shown in FIG. 2.
Figure 4:
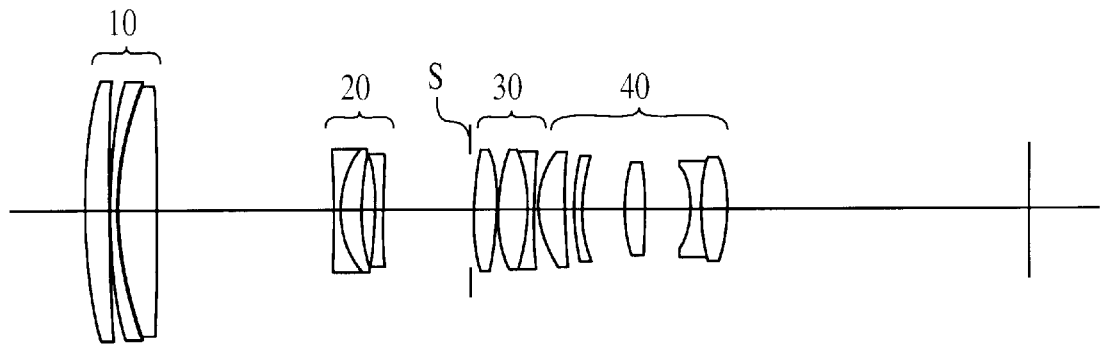
FIG. 4 is a schematic view showing the lens arrangement of the first embodiment of a telephoto zoom lens at an intermediate focal length, according to the present invention.
Figures 5A, 5B, 5C, 5D:
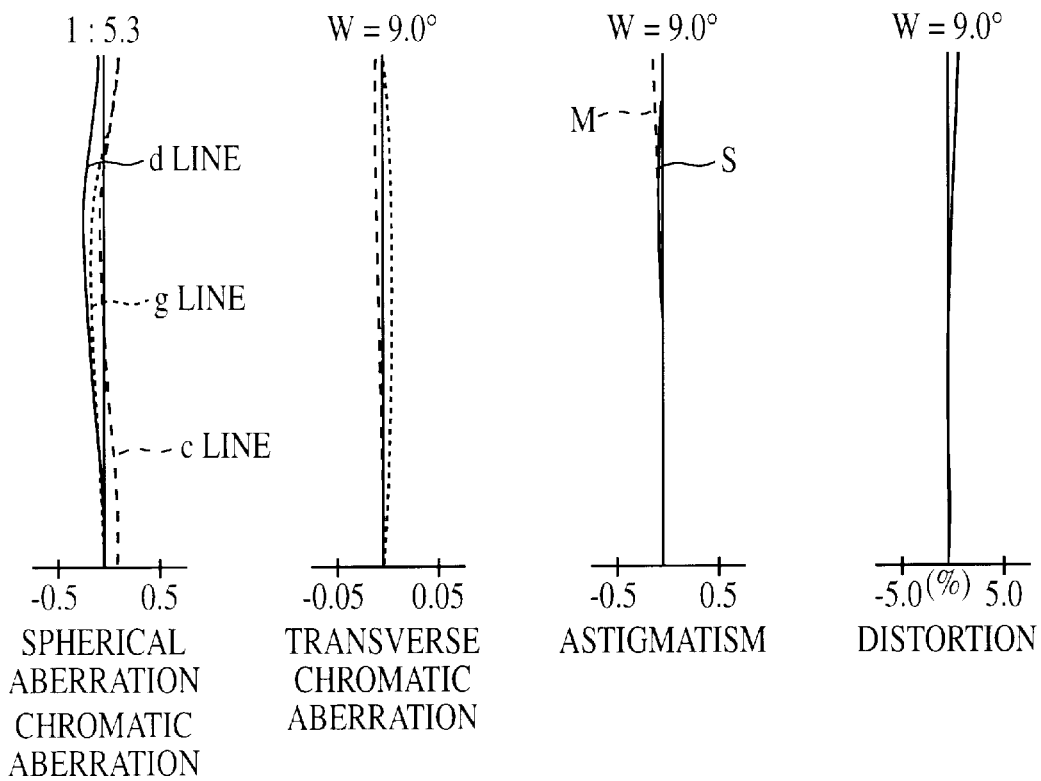
FIGS. 5A, 5B, 5C and 5D show aberration diagrams of a zoom lens shown in FIG. 4.
Figure 6:
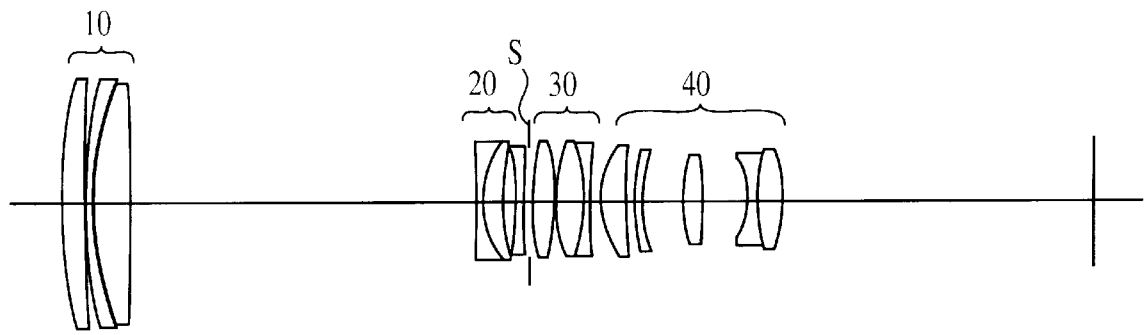
FIG. 6 is a schematic view showing the lens arrangement of the first embodiment of a telephoto zoom lens at a long focal length extremity, according to the present invention.
Figure 7A:
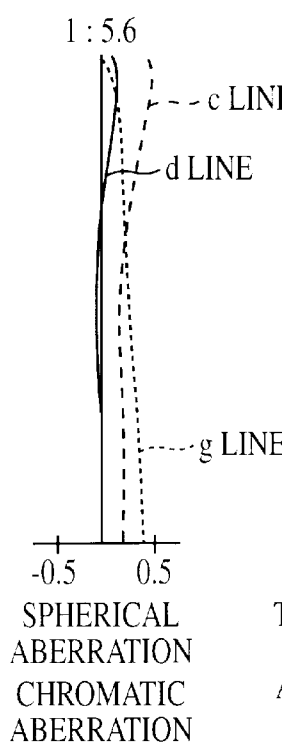
FIGS. 7A, 7B, 7C and 7D show aberration diagrams of the zoom lens shown in FIG. 6.
Figure 7B:
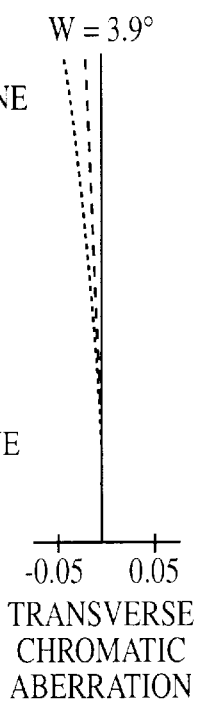
Figure 7C:
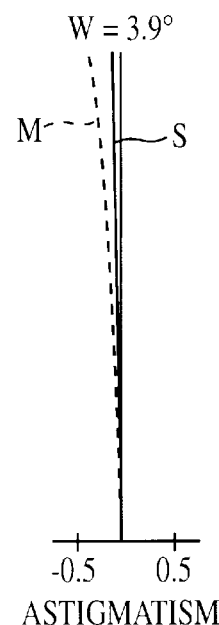
Figure 7D:
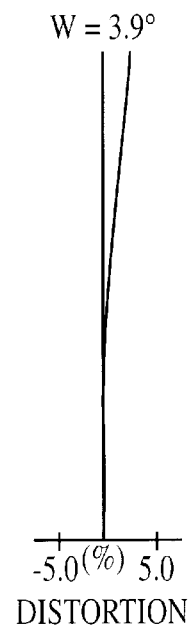

FIGS. 2 through 7 show a first embodiment of a telephoto zoom lens according to the present invention. FIGS. 2, 4 and 6 show a lens arrangement of the zoom lens system at the short focal length extremity, an intermediate focal length and the long focal length extremity, respectively. In the first embodiment, the first positive lens group 10 is composed of three lens elements; the second negative lens group 20 is composed of three lens elements; two of which are cemented, the third positive lens group 30 is composed of three lens elements; two of which are cemented, and the fourth positive lens group 40 is composed of five lens elements. The diaphragm S is located before the third lens group 30 so as to move together with the third lens group. I represents the image surface. FIGS. 3A, 3B, 3C and 3D, FIGS. 5A, 5B, 5C and 5D, and FIGS. 7A, 7B, 7C and 7D show aberration diagrams of the zoom lens system shown in FIGS. 2, 4 and 6, respectively.

Numerical data regarding the lens system of embodiment 1 is shown in Table 1 below.

TABLE 1

$F_{NO}$ = 1:4.8–5.3–5.7
f = 81.46–135.00–312.00
zoom ratio (= longest focal length of the entire zoom lens/ shortest focal length of the entire zoom lens); 3.83)
W = 15.2–9.0–3.9
$f_B$ = 53.74–62.91–68.04

| Surface No. | R | D | Nd | νd |
|---|---|---|---|---|
| 1 | 120.928 | 5.14 | 1.48749 | 70.2 |
| 2 | 497.398 | 0.10 | — | — |
| 3 | 104.324 | 2.00 | 1.80518 | 25.4 |
| 4 | 69.341 | 0.38 | — | — |
| 5 | 72.924 | 8.16 | 1.48749 | 70.2 |
| 6 | −859.618 | 5.63–37.44–76.40 | — | — |
| 7 | −196.928 | 1.30 | 1.71999 | 50.2 |
| 8 | 22.146 | 4.50 | 1.84666 | 23.8 |
| 9 | 56.566 | 2.94 | — | — |
| 10 | −56.213 | 1.40 | 1.77250 | 49.6 |
| 11 | 182.378 | 25.38–18.51–1.40 | — | — |
| Diaphragm | ∞ | 0.80 | — | — |
| 12 | 61.957 | 4.81 | 1.48749 | 70.2 |
| 13 | −49.540 | 0.10 | — | — |
| 14 | 37.131 | 6.39 | 1.48749 | 70.2 |
| 15 | −35.882 | 1.20 | 1.83481 | 42.7 |
| 16 | 105.115 | 4.40–1.34–2.72 | — | — |
| 17 | 22.755 | 5.40 | 1.51633 | 64.1 |
| 18 | 133.755 | 1.91 | — | — |
| 19 | 57.198 | 1.70 | 1.80518 | 25.4 |
| 20 | 31.777 | 9.18 | — | — |
| 21 | 49.097 | 4.00 | 1.60311 | 60.7 |
| 22 | −108.017 | 10.02 | — | — |
| 23 | —16.466 | 1.80 | 1.80400 | 46.6 |
| 24 | 43.829 | 0.20 | — | — |
| 25 | 43.513 | 5.42 | 1.69895 | 30.1 |
| 26 | −34.727 | — | — | — |

<Embodiment 2>

Figure 8:
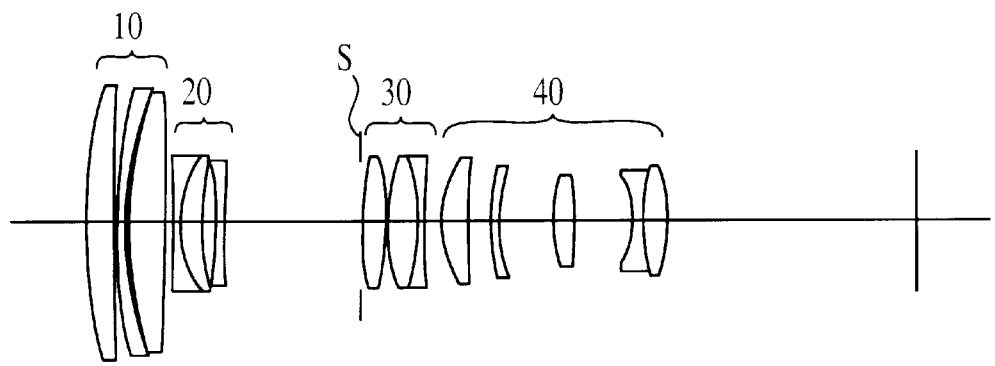
FIG. 8 is a schematic view showing the lens arrangement of a second embodiment of a telephoto zoom lens at a short focal length extremity, according to the present invention.
Figure 9A:
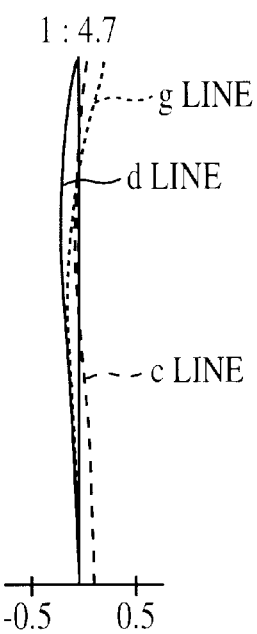
FIGS. 9A, 9B, 9C and 9D show aberration diagrams of the zoom lens shown in FIG. 8.
Figure 9B:
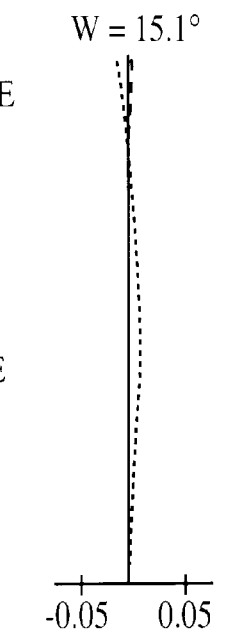
Figure 9C:
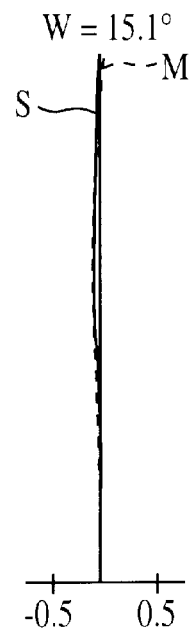
Figure 9D:
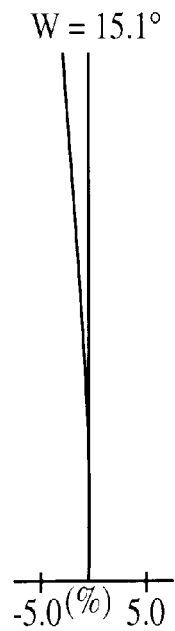
Figure 10:
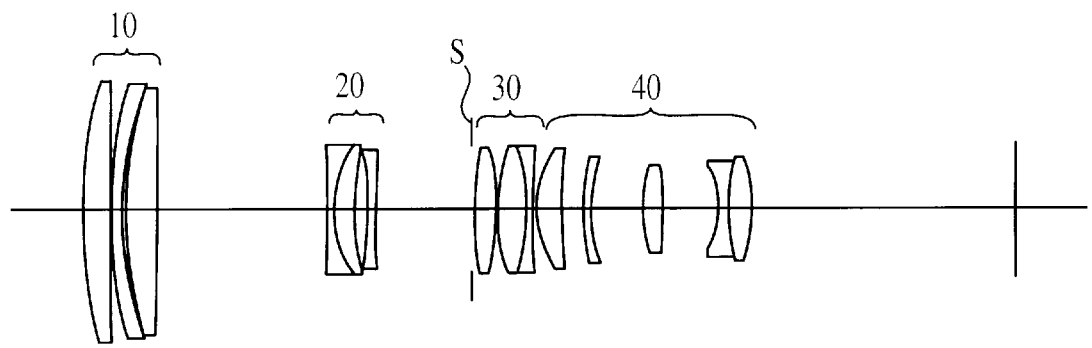
FIG. 10 is a schematic view showing the lens arrangement of the second embodiment of a telephoto zoom lens at an intermediate focal length, according to the present invention.
Figures 11A, 11B, 11C, 11D:
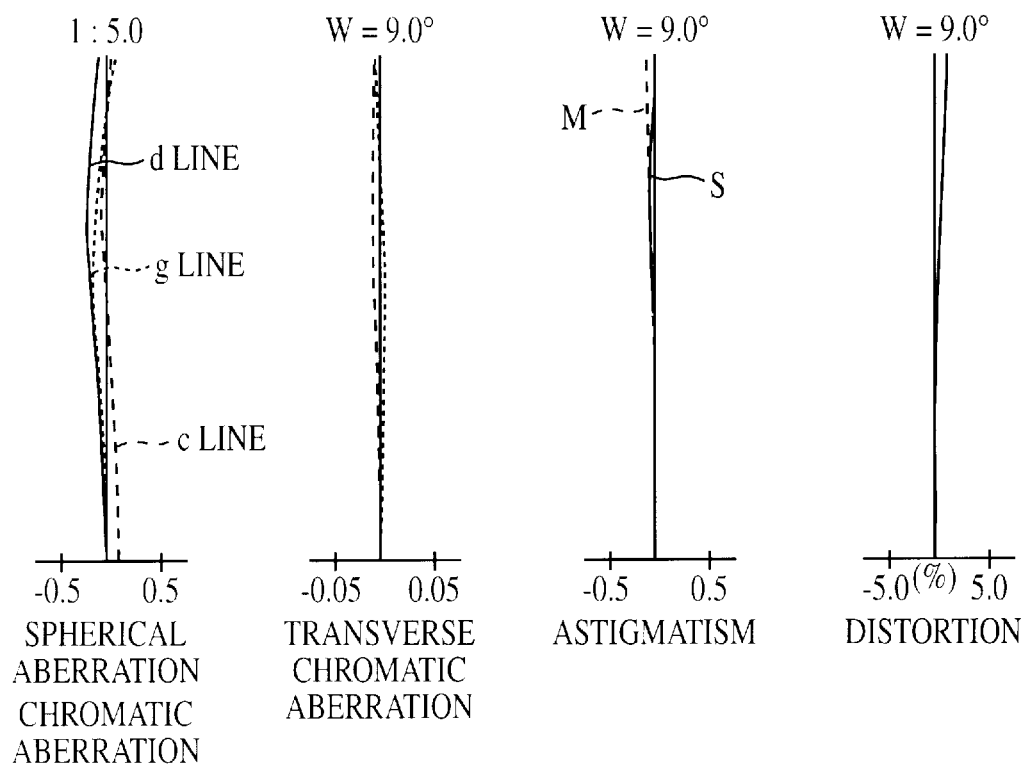
FIGS. 11A, 11B, 11C and 11D show aberration diagrams of the zoom lens shown in FIG. 10.

FIGS. 8 through 13 show a second embodiment of a telephoto zoom lens, according to the present invention. FIGS. 8, 10 and 12 show a lens arrangement thereof at the short focal length extremity, an intermediate focal length, and the long focal length extremity, respectively. In the second embodiment, the first positive lens group 10 is composed of three lens elements; the second negative lens group 20 is composed of three lens elements; two of which are cemented, the third positive lens group 30 is composed of three lens elements; two of which are cemented, and the fourth positive lens group 40 is composed of five lens elements. The diaphragm S is located before the third lens group 30 so as to move together therewith. FIGS. 9A, 9B, 9C and 9D, FIGS. 11A, 11B, 11C and 11D, and FIGS. 13A, 13B, 13C and 13D show aberration diagrams of the zoom lens system shown in FIGS. 8, 10 and 12, respectively.

Numerical data regarding the lens system of embodiment 2 is shown in Table 2 below.

TABLE 2

$F_{NO} = 1{:}4.7{-}5.0{-}5.7$
f = 82.00–135.01–311.93 (zoom ratio; 3.80)
W = 15.1–9.0–3.9
$f_B$ = 50.92–56.16–67.82

| Surface No. | R | D | Nd | νd |
|---|---|---|---|---|
| 1 | 104.006 | 6.19 | 1.48749 | 70.2 |
| 2 | 1553.813 | 0.10 | — | — |
| 3 | 107.346 | 2.00 | 1.80518 | 25.4 |
| 4 | 70.512 | 0.80 | — | — |
| 5 | 80.875 | 7.13 | 1.48749 | 70.2 |
| 6 | 33993.175 | 2.00–37.21–70.51 | — | — |
| 7 | −205.497 | 1.30 | 1.71999 | 50.2 |
| 8 | 23.645 | 4.50 | 1.84666 | 23.8 |
| 9 | 58.817 | 2.83 | — | — |
| 10 | −58.829 | 1.40 | 1.77250 | 49.6 |
| 11 | 223.338 | 27.91–20.45–1.40 | — | — |
| Diaphragm | ∞ | 0.80 | — | — |
| 12 | 86.842 | 4.68 | 1.48749 | 70.2 |
| 13 | −49.807 | 0.10 | — | — |
| 14 | 40.162 | 6.40 | 1.48749 | 70.2 |
| 15 | −40.483 | 1.20 | 1.83481 | 42.7 |
| 16 | 140.999 | 3.87–1.05–2.97 | — | — |
| 17 | 25.738 | 5.40 | 1.51633 | 64.1 |
| 18 | 153.198 | 4.41 | — | — |
| 19 | 67.614 | 1.70 | 1.80518 | 25.4 |
| 20 | 34.755 | 11.33 | — | — |
| 21 | 44.657 | 4.00 | 1.60311 | 60.7 |
| 22 | −326.691 | 12.00 | — | — |
| 23 | −18.102 | 1.80 | 1.80400 | 46.6 |
| 24 | 48.980 | 0.10 | — | — |
| 25 | 47.158 | 5.13 | 1.69895 | 30.1 |
| 26 | −35.199 | — | — | — |

<Embodiment 3>

Figure 14:
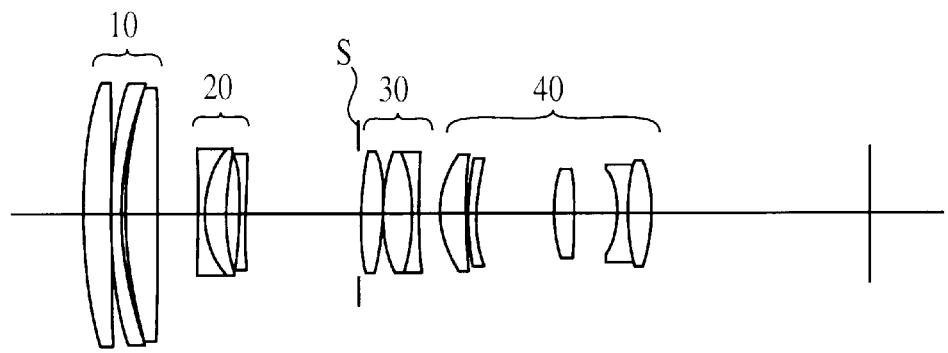
FIG. 14 is a schematic view showing the lens arrangement of a third embodiment of a telephoto zoom lens at a short focal length extremity, according to the present invention.
Figures 15A, 15B, 15C, 15D:
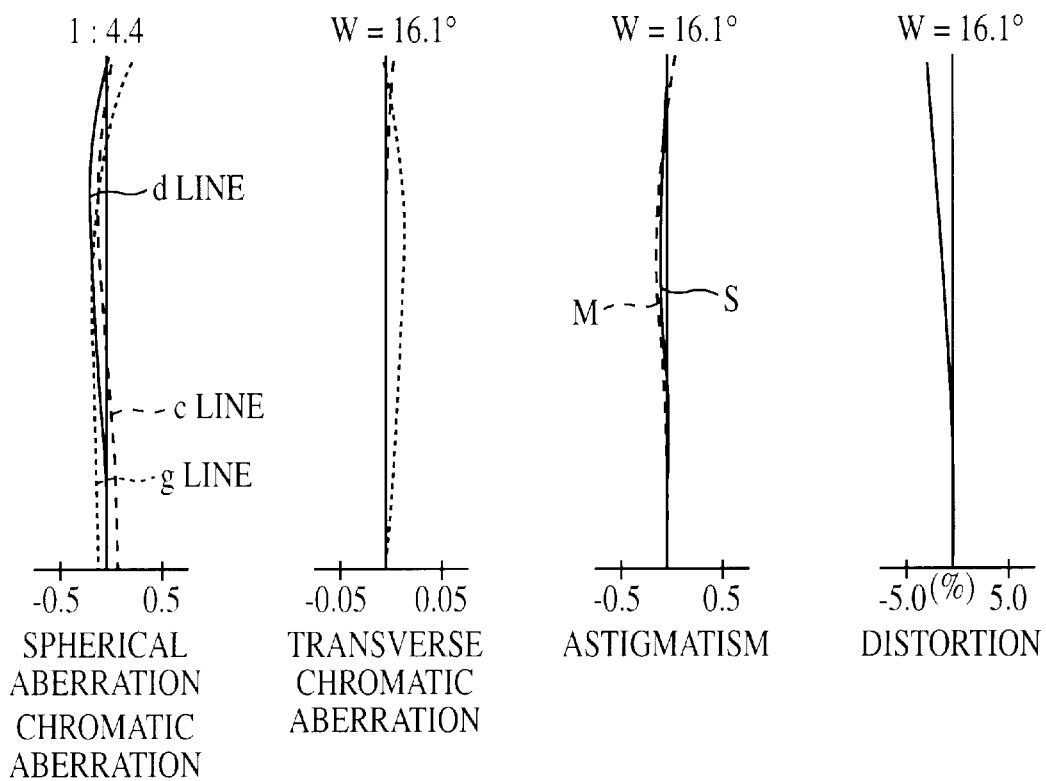
FIGS. 15A, 15B, 15C and 15D show aberration diagrams of the zoom lens shown in FIG. 14.
Figure 16:
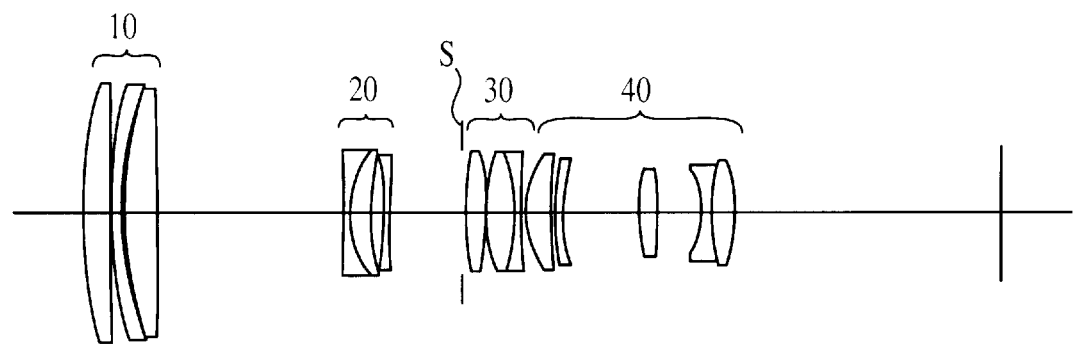
FIG. 16 is a schematic view showing the lens arrangement of the third embodiment of a telephoto zoom lens at an intermediate focal length, according to the present invention.
Figures 17A, 17B, 17C, 17D:
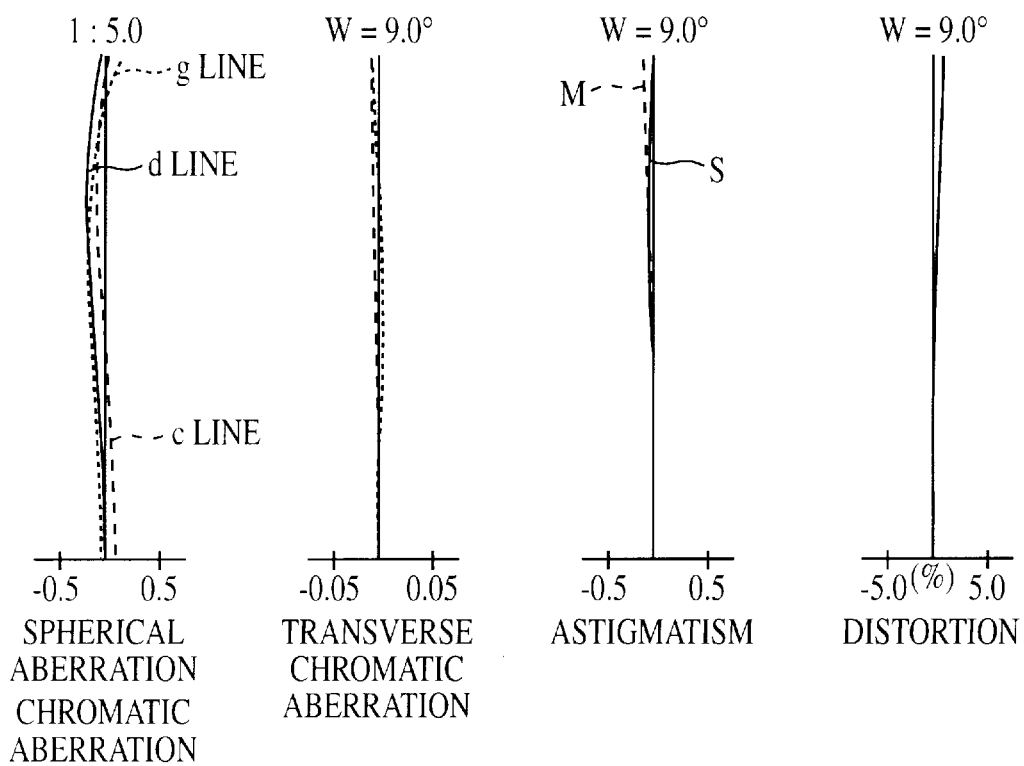
FIGS. 17A, 17B, 17C and 17D show aberration diagrams of the zoom lens shown in FIG. 16.

FIGS. 14 through 19 show a third embodiment of a telephoto zoom lens system according to the present invention. FIGS. 14, 16 and 18 show a lens arrangement thereof at the short focal length extremity, an intermediate focal length extremity, and the long focal length extremity, respectively. In the third embodiment, the first positive lens group 10 is composed of three lens elements; the second negative lens group 20 is composed of three lens elements; two of which are cemented, the third positive lens group 30 is composed of three lens elements; two of which are cemented, and the fourth positive lens group is composed of five lens elements, respectively. The diaphragm S is located before the third lens group 30 so as to move together therewith. FIGS. 15A, 15B, 15C and 15D, FIGS. 17A, 17B, 17C and 17D, and FIGS. 19A, 19B, 19C and 19D show aberration diagrams of the zoom lens system shown in FIGS. 14, 16 and 18, respectively.

Numerical data regarding the lens system of embodiment 3 is shown in Table 3 below.

TABLE 3

$F_{NO} = 1{:}4.4{-}5.0{-}5.7$
f = 77.00–135.00–289.98 (zoom ratio; 3.77)
W = 16.1–9.0–4.2
$f_B$ = 45.26–56.75–69.16

| Surface No. | R | D | Nd | νd |
|---|---|---|---|---|
| 1 | 106.852 | 5.84 | 1.58913 | 61.2 |
| 2 | 690.923 | 0.10 | — | — |
| 3 | 112.487 | 2.00 | 1.80518 | 25.4 |
| 4 | 69.411 | 0.67 | — | — |
| 5 | 77.283 | 7.35 | 1.48749 | 70.2 |

TABLE 3-continued $F_{NO} = 1{:}4.4{-}5.0{-}5.7$
f = 77.00–135.00–289.98 (zoom ratio; 3.77)
W = 16.1–9.0–4.2
$f_B$ = 45.26–56.75–69.16

| Surface No. | R | D | Nd | νd |
|---|---|---|---|---|
| 6 | −54997.615 | 8.79–40.18–69.66 | — | — |
| 7 | −168.653 | 1.30 | 1.71299 | 53.9 |
| 8 | 22.506 | 4.50 | 1.84666 | 23.8 |
| 9 | 52.397 | 3.05 | — | — |
| 10 | −51.415 | 1.40 | 1.77250 | 49.6 |
| 11 | 301.567 | 23.53–15.54–1.50 | — | — |
| Diaphragm | ∞ | 0.80 | — | — |
| 12 | 95.405 | 4.39 | 1.49700 | 81.6 |
| 13 | −47.916 | 0.10 | — | — |
| 14 | 43.731 | 5.91 | 1.48749 | 70.2 |
| 15 | −39.451 | 1.20 | 1.80400 | 46.6 |
| 16 | 1518.453 | 4.59–1.08–2.69 | — | — |
| 17 | 22.873 | 5.40 | 1.51633 | 64.1 |
| 18 | 92.351 | 0.80 | — | — |
| 19 | 75.063 | 1.70 | 1.80518 | 25.4 |
| 20 | 32.919 | 16.29 | — | — |
| 21 | 43.342 | 4.00 | 1.60311 | 60.7 |
| 22 | −250.734 | 9.36 | — | — |
| 23 | −18.665 | 1.80 | 1.78800 | 47.4 |
| 24 | 45.816 | 0.15 | — | — |
| 25 | 43.807 | 5.67 | 1.67270 | 32.1 |
| 26 | −36.947 | — | — | — |

<Embodiment 4>

Figure 22:
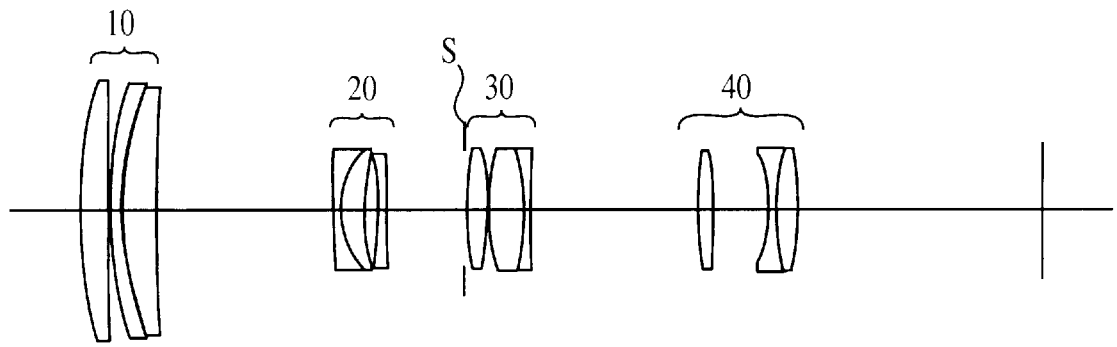
FIG. 22 is a schematic view showing the lens arrangement of the fourth embodiment of a telephoto zoom lens at an intermediate focal length, according to the present invention.
Figures 23A, 23B, 23C, 23D:
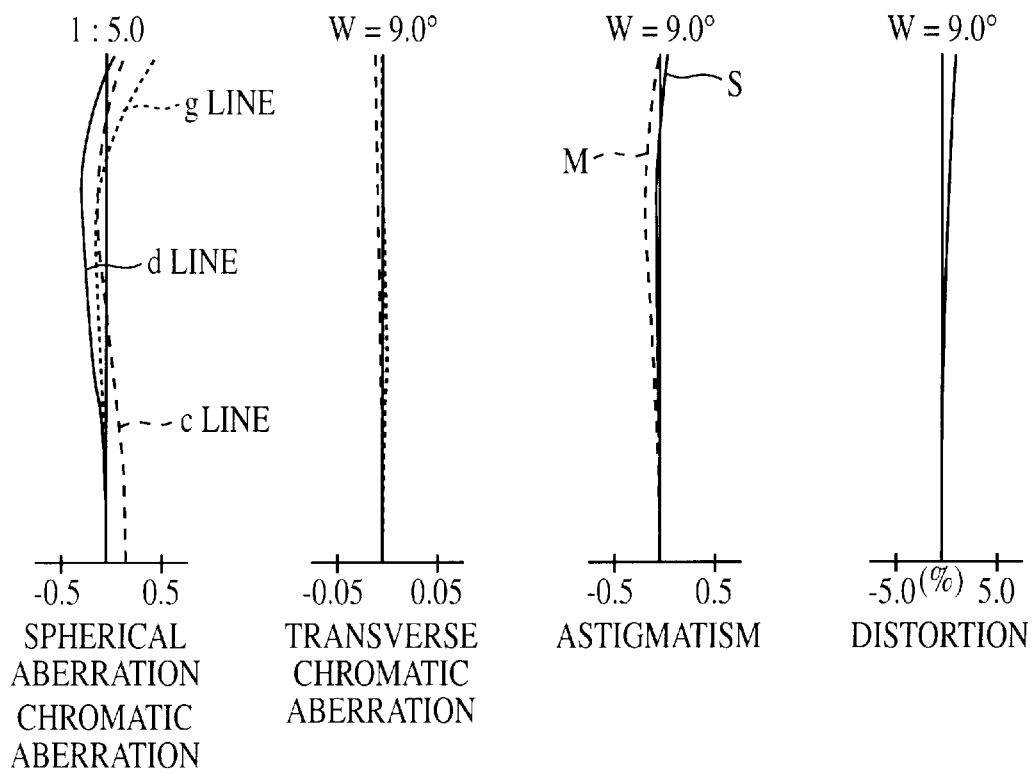
FIGS. 23A, 23B, 23C and 23D show aberration diagrams of the zoom lens shown in FIG. 22.

FIGS. 20 through 25 show a fourth embodiment of a telephoto zoom lens system according to the present invention. FIGS. 20, 22 and 24 show a lens arrangement thereof at the short focal length extremity, an intermediate focal length extremity, and the long focal length extremity, respectively. In the fourth embodiment, the first positive lens group 10 is composed of three lens elements; the second negative lens group 20 is composed of three lens elements; two of which are cemented, the third positive lens group 30 is composed of three lens elements; two of which are cemented, and the fourth negative lens group 40 is composed of three lens elements, two of which are cemented, respectively. The diaphragm S is located before the third lens group 30 so as to move together therewith. FIGS. 21A, 21B, 21C and 21D, FIGS. 23A, 23B, 23C and 23D, and FIGS. 25A, 25B, 25C and 25D show aberration diagrams of the zoom lens system shown in FIGS. 20, 22 and 24, respectively.

Numerical data regarding the lens system of embodiment 4 is shown in Table 4 below.

TABLE 4

$F_{NO} = 1{:}4.6{-}5.0{-}5.7$
f = 81.98–135.01–312.00 (zoom ratio; 3.81)
W = 15.1–9.0–3.9
$f_B$ = 45.03–51.64–62.44

| Surface No. | R | D | Nd | νd |
|---|---|---|---|---|
| 1 | 115.657 | 6.35 | 1.48749 | 70.2 |
| 2 | −560.578 | 0.15 | — | — |
| 3 | 94.572 | 2.00 | 1.80518 | 25.4 |
| 4 | 63.211 | 0.48 | — | — |
| 5 | 67.413 | 7.31 | 1.48749 | 70.2 |
| 6 | 334.568 | 5.73–37.62–68.25 | — | — |
| 7 | −9088.912 | 1.60 | 1.75700 | 47.8 |
| 8 | 19.029 | 5.29 | 1.84666 | 23.8 |

TABLE 4-continued $F_{NO} = 1:4.6-5.0-5.7$
f = 81.98–135.01–312.00 (zoom ratio; 3.81)
W = 15.1–9.0–3.9
$f_B$ = 45.03–51.64–62.44

| Surface No. | R | D | Nd | νd |
|---|---|---|---|---|
| 9 | 52.729 | 3.13 | — | — |
| 10 | −43.878 | 1.40 | 1.83481 | 42.7 |
| 11 | 233.678 | 22.97–16.93–1.90 | — | — |
| Diaphragm | ∞ | 0.60 | — | — |
| 12 | 101.873 | 4.02 | 1.74100 | 52.7 |
| 13 | −67.573 | 0.10 | — | — |
| 14 | 39.612 | 7.67 | 1.48749 | 70.2 |
| 15 | −48.704 | 1.40 | 1.84666 | 23.8 |
| 16 | 14139.748 | 35.73–35.16–39.37 | — | — |
| 17 | 55.952 | 3.89 | 1.51633 | 64.1 |
| 18 | −107.087 | 11.87 | — | — |
| 19 | −29.712 | 1.50 | 1.83481 | 42.7 |
| 20 | 62.026 | 4.29 | 1.80518 | 25.4 |
| 21 | −92.221 | — | — | — |

<Embodiment 5>

Figure 26:
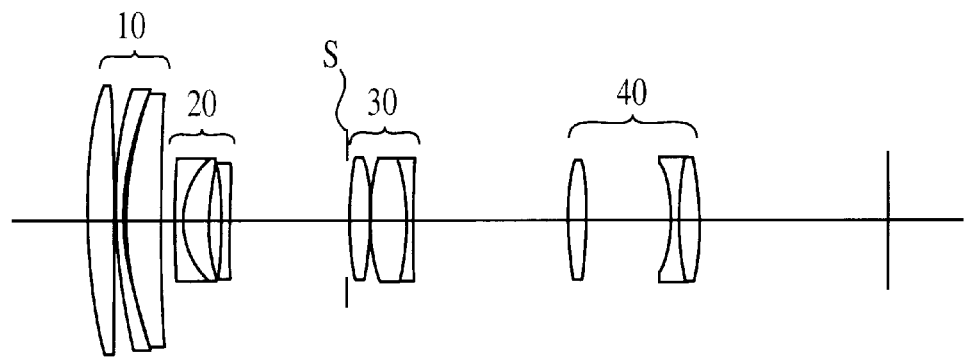
FIG. 26 is a schematic view showing the lens arrangement of a fifth embodiment of a telephoto zoom lens at the short focal length extremity, according to the present invention.
Figures 27A, 27B, 27C, 27D:
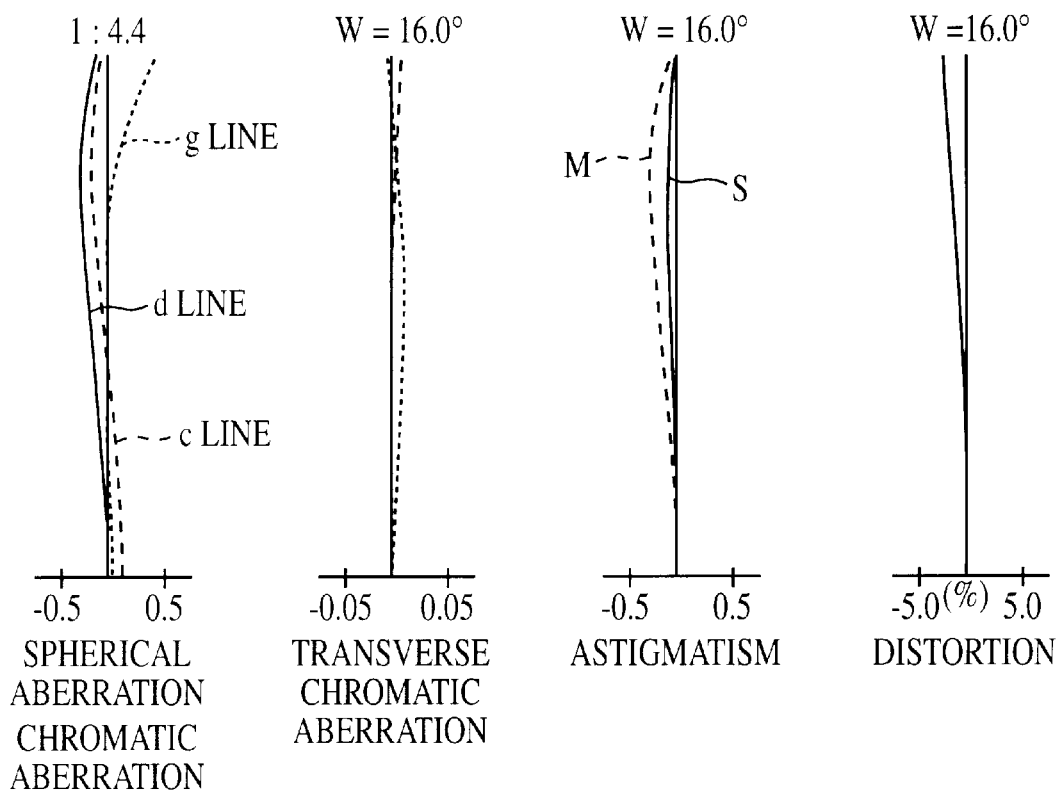
FIGS. 27A, 27B, 27C and 27D show aberration diagrams of the zoom lens shown in FIG. 26.
Figure 28:
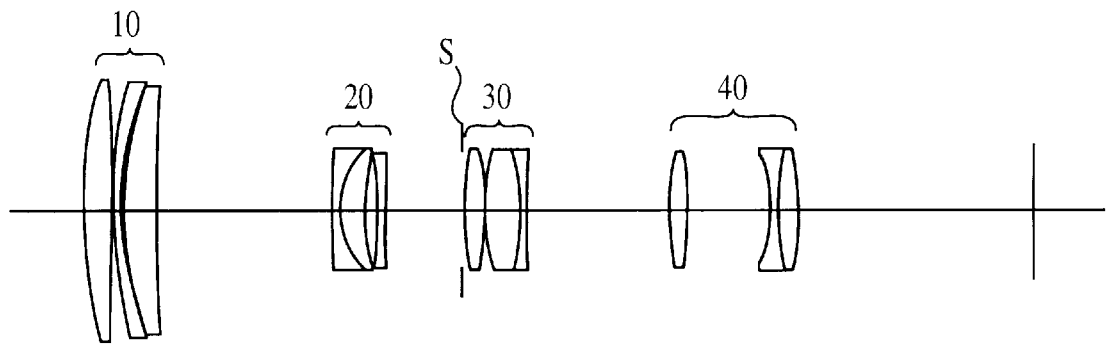
FIG. 28 is a schematic view showing the lens arrangement of a fifth embodiment of a telephoto zoom lens at an intermediate focal length, according to the present invention.
Figures 29A, 29B, 29C, 29D:
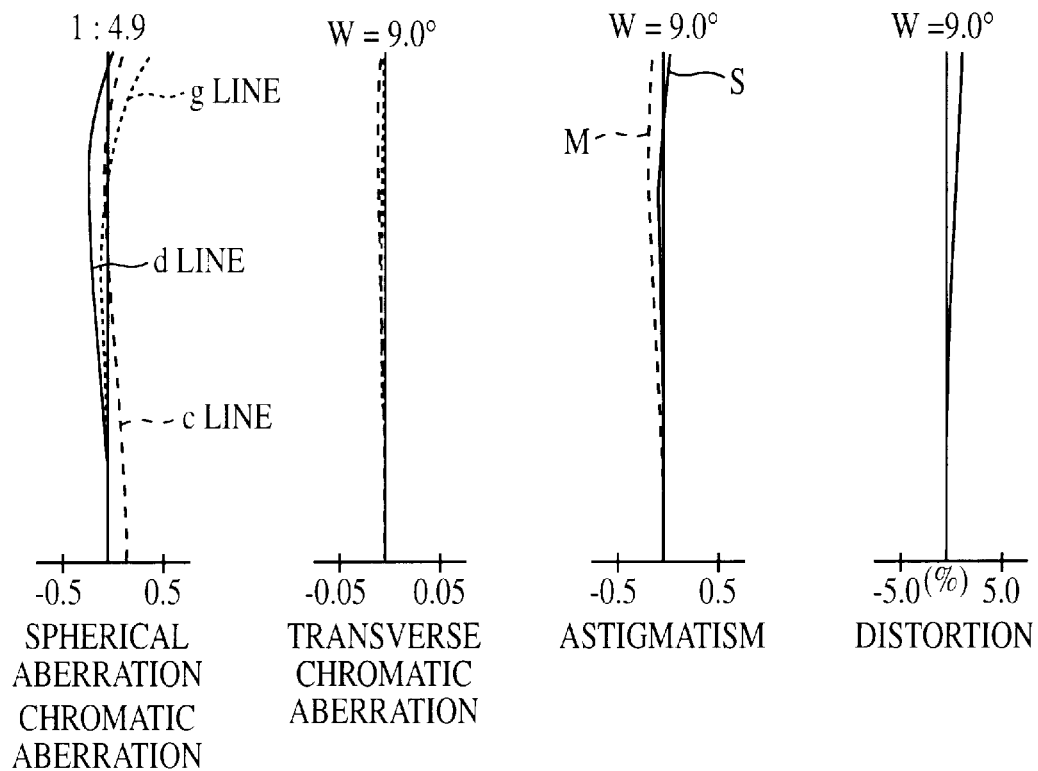
FIGS. 29A, 29B, 29C and 29D show aberration diagrams of the zoom lens shown in FIG. 28.
Figure 30:
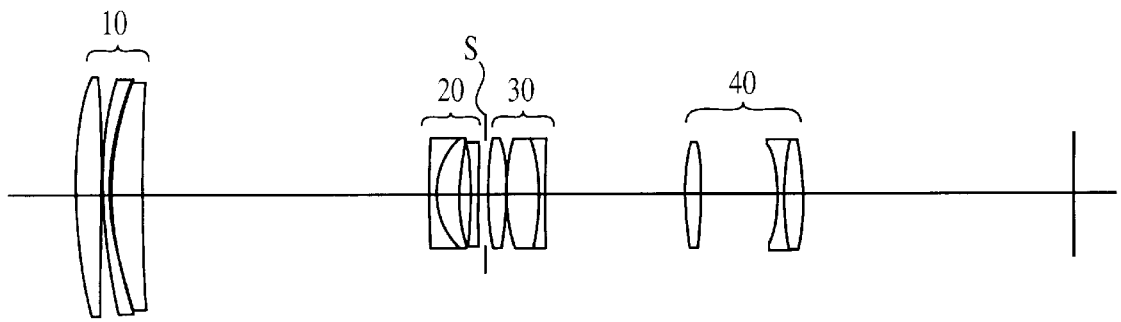
FIG. 30 is a schematic view showing the lens arrangement of the fifth embodiment of a telephoto zoom lens at a long focal length extremity, according to the present invention.
Figures 31A, 31B, 31C, 31D:
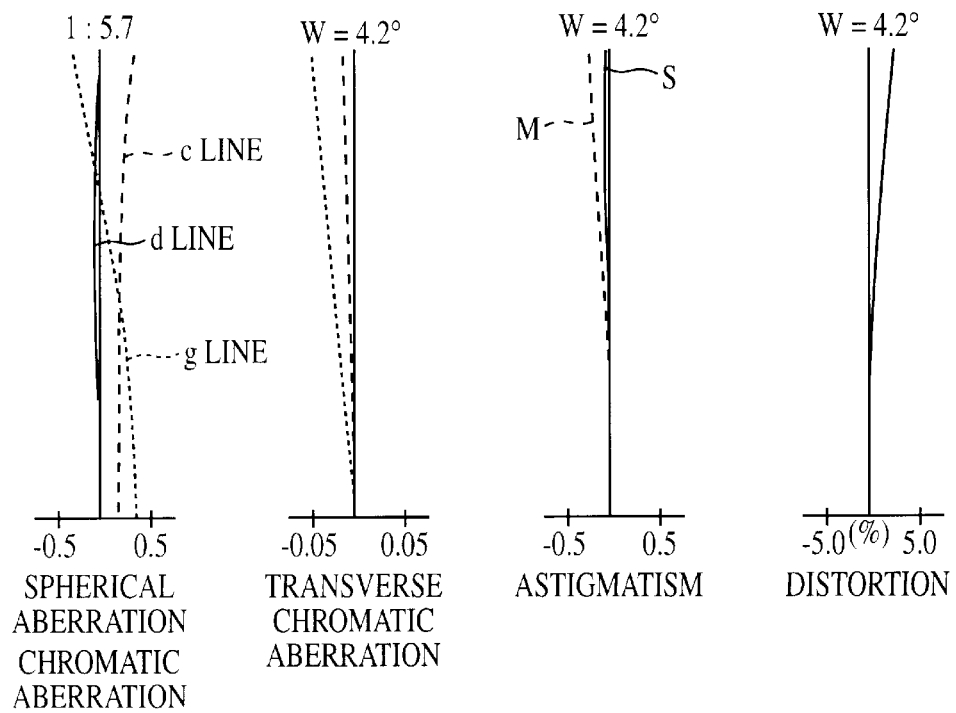
FIGS. 31A, 31B, 31C and 31D show aberration diagrams of the zoom lens shown in FIG. 30.

FIGS. 26 through 31 show a fifth embodiment of a telephoto zoom lens system according to the present invention. FIGS. 26, 28 and 30 show a lens arrangement thereof at the short focal length extremity, an intermediate focal length extremity, and the long focal length extremity, respectively. In the fifth embodiment, the first positive lens group 10 is composed of three lens elements; the second negative lens group 20 is composed of three lens elements; two of which are cemented, the third positive lens group 30 is composed of three lens elements; two of which are cemented, and the fourth negative lens group 40 is composed of three lens elements, two of which are cemented, respectively. The diaphragm S is located before the third lens group 30 so as to move together therewith. FIGS. 27A, 27B, 27C and 27D, FIGS. 29A, 29B, 29C and 29D, and FIGS. 31A, 31B, 31C and 31D show aberration diagrams of the zoom lens system shown in FIGS. 26, 28 and 30, respectively.

Numerical data regarding the lens system of embodiment 5 is shown in Table 5 below.

TABLE 5

$F_{NO} = 1:4.4-4.9-5.7$
f = 77.00–135.00–290.00 (zoom ratio; 3.77)
W = 16.0–9.0–4.2
$f_B$ = 39.00–49.16–61.69

| Surface No. | R | D | Nd | νd |
|---|---|---|---|---|
| 1 | 110.191 | 5.86 | 1.48749 | 70.2 |
| 2 | −687.390 | 0.15 | — | — |
| 3 | 97.681 | 2.00 | 1.80518 | 25.4 |
| 4 | 64.584 | 0.51 | — | — |
| 5 | 70.315 | 6.57 | 1.48749 | 70.2 |
| 6 | 339.773 | 3.50–38.01–67.18 | — | — |
| 7 | −575.150 | 1.60 | 1.75700 | 47.8 |
| 8 | 20.392 | 5.10 | 1.84666 | 23.8 |
| 9 | 60.896 | 2.74 | — | — |
| 10 | −51.012 | 1.40 | 1.83481 | 42.7 |
| 11 | 213.923 | 24.57–16.64–1.90 | — | — |
| Diaphragm | ∞ | 0.60 | — | — |
| 12 | 117.531 | 3.83 | 1.73400 | 51.5 |
| 13 | −71.487 | 0.10 | — | — |
| 14 | 42.526 | 7.60 | 1.48749 | 70.2 |
| 15 | −46.301 | 1.40 | 1.84666 | 23.8 |

TABLE 5-continued $F_{NO} = 1:4.4-4.9-5.7$
f = 77.00–135.00–290.00 (zoom ratio; 3.77)
W = 16.0–9.0–4.2
$f_B$ = 39.00–49.16–61.69

| Surface No. | R | D | Nd | νd |
|---|---|---|---|---|
| 16 | −569.606 | 32.45–30.39–32.51 | — | — |
| 17 | 78.293 | 3.87 | 1.48749 | 70.2 |
| 18 | −74.925 | 17.66 | — | — |
| 19 | −27.537 | 1.50 | 1.80400 | 46.6 |
| 20 | 102.305 | 3.98 | 1.80518 | 25.4 |
| 21 | −79.548 | — | — | — |

<Embodiment 6>

Figure 32:
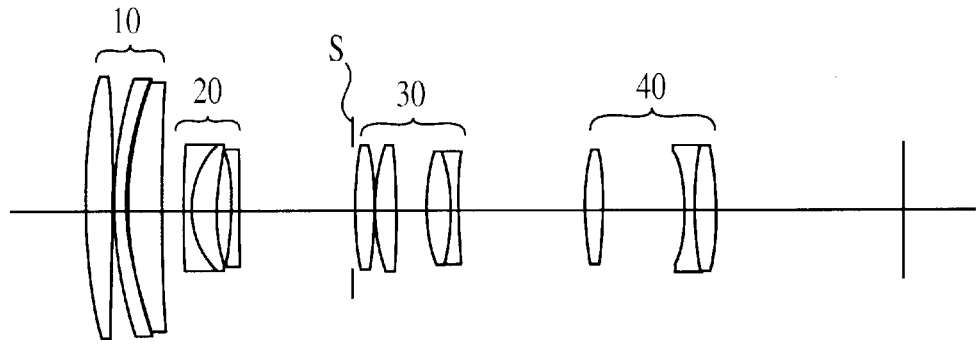
FIG. 32 is a schematic view showing the lens arrangement of a sixth embodiment of a telephoto zoom lens at a short focal length extremity, according to the present invention.
Figures 33A, 33B, 33C, 33D:
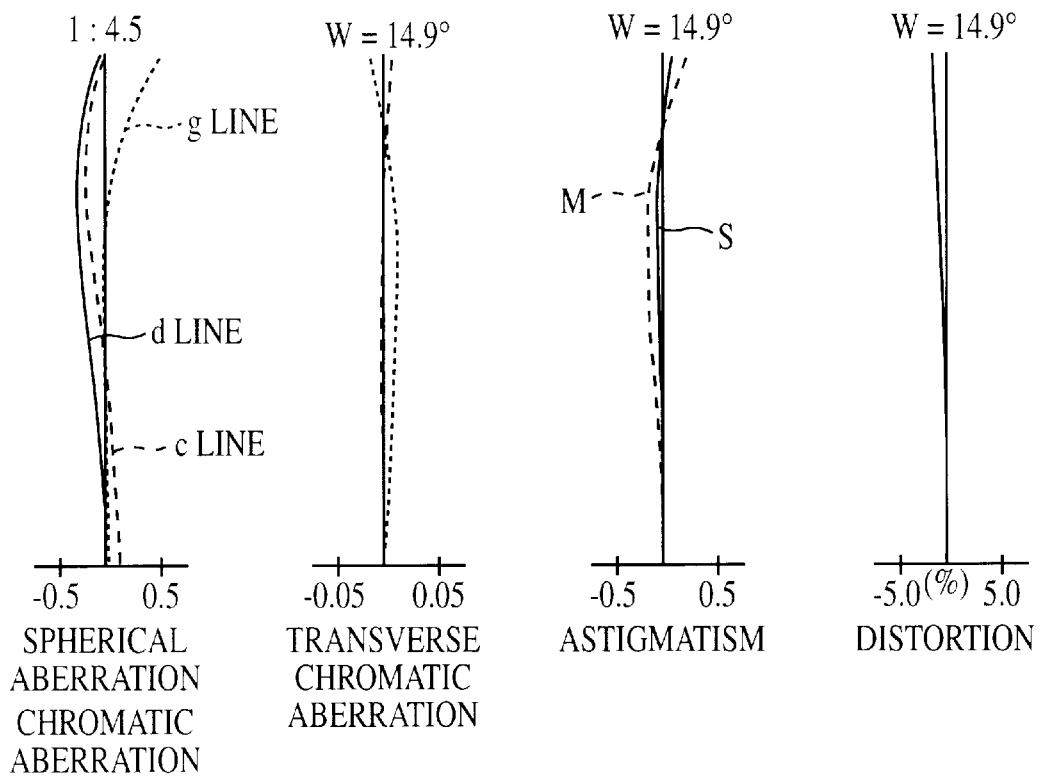
FIGS. 33A, 33B, 33C and 33D show aberration diagrams of the zoom lens shown in FIG. 32.
Figure 36:
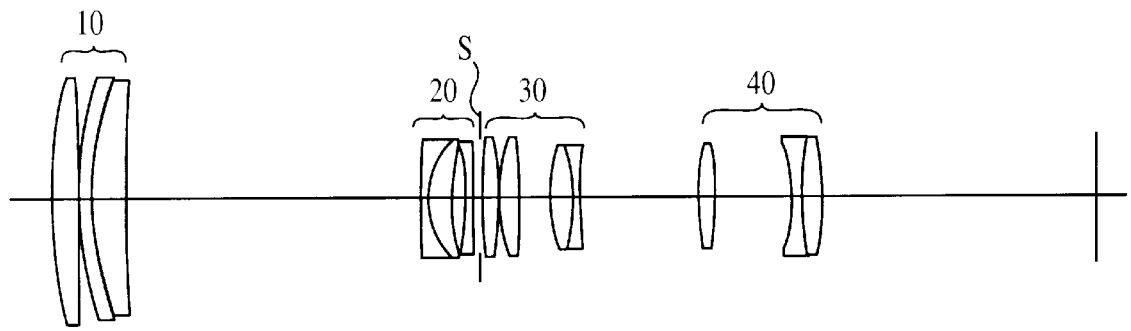
FIG. 36 is a schematic view showing the lens arrangement of the sixth embodiment of a telephoto zoom lens at a long focal length extremity, according to the present invention; and, FIGS. 37A, 37B, 37C and 37D show aberration diagrams of the zoom lens shown in FIG. 36.
Figures 37A, 37B, 37C, 37D:
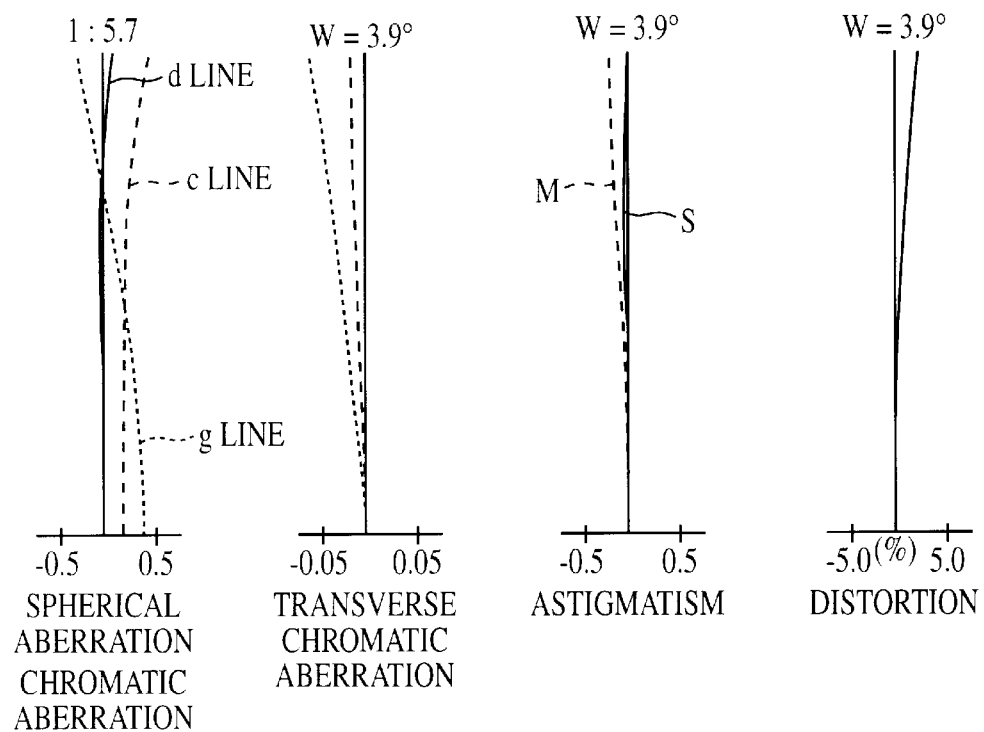

FIGS. 32 through 37 show a sixth embodiment of a telephoto zoom lens system according to the present invention. FIGS. 32, 34 and 36 show a lens arrangement thereof at the short focal length extremity, an intermediate focal length extremity, and the long focal length extremity, respectively. In the sixth embodiment, the first positive lens group 10 is composed of three lens elements; the second negative lens group 20 is composed of three lens elements; two of which are cemented, the third positive lens group 30 is composed of four lens elements; two of which are cemented, and the fourth positive lens group 40 is composed of three lens elements, two of which are cemented, respectively. The diaphragm S is located before the third lens group 30 so as to move together therewith. FIGS. 33A, 33B, 33C and 33D, FIGS. 35A, 35B, 35C and 35D, and FIGS. 37A, 37B, 37C and 37D show aberration diagrams of the zoom lens system shown in FIGS. 32, 34 and 36, respectively.

Numerical data regarding the lens system of embodiment 6 is shown in Table 6 below.

TABLE 6

$F_{NO} = 1:4.5-4.9-5.7$
f = 82.43–135.00–309.99 (zoom ratio; 3.76)
W = 14.9–9.0–3.9
$f_B$ = 38.99–47.67–61.17

| Surface No. | R | D | Nd | νd |
|---|---|---|---|---|
| 1 | 120.170 | 6.32 | 1.48749 | 70.2 |
| 2 | −624.975 | 0.15 | — | — |
| 3 | 98.500 | 2.50 | 1.80518 | 25.4 |
| 4 | 65.000 | 0.41 | — | — |
| 5 | 68.597 | 7.22 | 1.48749 | 70.2 |
| 6 | 413.302 | 4.87–35.19–66.39 | — | — |
| 7 | −1590.000 | 1.60 | 1.75700 | 47.8 |
| 8 | 19.920 | 5.18 | 1.84666 | 23.9 |
| 9 | 55.762 | 3.15 | — | — |
| 10 | −48.094 | 1.40 | 1.83481 | 42.7 |
| 11 | 238.573 | 24.29–17.61–1.90 | — | — |
| Diaphragm | ∞ | 0.60 | — | — |
| 12 | 161.880 | 3.41 | 1.72000 | 43.7 |
| 13 | −81.843 | 0.10 | — | — |
| 14 | 41.189 | 4.27 | 1.48749 | 70.2 |
| 15 | −460.253 | 6.99 | — | — |
| 16 | 48.280 | 4.90 | 1.48749 | 70.2 |
| 17 | −48.280 | 1.40 | 1.80518 | 25.4 |
| 18 | 77.000 | 27.00–24.97–27.18 | — | — |
| 19 | 76.700 | 3.66 | 1.51633 | 64.1 |
| 20 | −76.700 | 17.72 | — | — |
| 21 | −26.946 | 1.50 | 1.77250 | 49.6 |
| 22 | 50.845 | 4.87 | 1.78472 | 25.7 |
| 23 | −74.420 | — | — | — |

Numerical values of conditions (1) through (4) for each embodiment are shown in Table 7 below.

TABLE 7

|  | Condition (1) | Condition (2) | Condition (3) | Condition (4) |
|---|---|---|---|---|
| Embodiment 1 | 0.212 | 1.915 | 0.553 | 0.025 |
| Embodiment 2 | 0.276 | 1.876 | 0.492 | 0.105 |
| Embodiment 3 | 0.362 | 1.974 | 0.219 | 0.420 |
| Embodiment 4 | 0.337 | 1.808 | 0.079 | 0.926 |
| Embodiment 5 | 0.356 | 1.992 | 0.071 | 0.852 |
| Embodiment 6 | 0.364 | 1.821 | 0.013 | 0.764 |

As can be seen from Table 7, the numerical values of the first through sixth embodiments satisfy conditions (1) through (4). Furthermore, aberrations at the wide angle extremity, the intermediate focal length, and the telephoto extremity are appropriately compensated in a good balance.

According to the present invention, a small telephoto zoom lens having a zoom ratio of approximately 4 and exhibiting high image forming efficiency over the entire zoom range can be provided.

What is claimed is:

1. A telephoto zoom lens comprising a first lens group having a positive refractive power, a second lens group having a negative refractive power, a third lens group having a positive refractive power, and a fourth lens group, arranged in this order from an object side, a resultant refractive power of said third lens group and said fourth lens group being positive, wherein said first lens group, said third lens group and said fourth lens group are moved from an image side to said object side upon zooming from a short focal length extremity to a long focal length extremity, so that a distance between said first lens group and said second lens group increases, a distance between said second lens group and said third lens group decreases, and a distance between said third lens group and said fourth lens group becomes smallest at an intermediate focal length, and wherein said zoom lens satisfies the following conditions:

$0.1 < X_3/X_1 < 0.5$; and $1.5 < f_1/f_w < 2.2$; and wherein $X_1$ designates a distance between a position of said first lens group at a short focal length extremity and a position of said first lens group at a long focal length extremity along an optical axis, $X_3$ designates a distance between a position of said third lens group at said short focal length extremity and a position of said third lens group at said long focal length extremity along said optical axis, $f_w$ designates a focal length of said zoom lens at said short focal length extremity, and $f_1$ designates a focal length of said first lens group.

2. A telephoto zoom lens according to claim 1, wherein said zoom lens satisfies the following condition:

$0 < f_3/|f_4| < 0.7$ wherein $f_3$ designates a focal length of said third lens group, and $f_4$ designates a focal length of said fourth lens group.

3. A telephoto zoom lens according to claim 1, wherein said zoom lens satisfies the following condition:

$0 < m_{4s} < 1.0$ wherein $m_{4s}$ designates a lateral magnification of said fourth lens group at said short focal length extremity.

4. A telephoto zoom lens according to claim 1, wherein said second lens group is moved from said object side to said image side upon zooming from said short focal length extremity to said long focal length extremity.

5. A telephoto zoom lens according to claim 1, wherein said second lens group does not move upon zooming from said short focal length extremity to said long focal length extremity.

6. A telephoto zoom lens according to claim 1, further comprising a diaphragm which is moved together with said third lens group upon zooming.

7. A telephoto zoom lens according to claim 1, wherein a focusing is carried out by said first lens group.

* * * * *